(12) United States Patent
Fong

(10) Patent No.: US 10,293,305 B2
(45) Date of Patent: May 21, 2019

(54) DEVICE OF PURIFYING HYDROGEN FLUORIDE IN SEMICONDUCTOR PROCESS WASTE GAS

(71) Applicant: ORIENT SERVICE CO., LTD., Taipei (TW)

(72) Inventor: Wu-Yu Fong, Taipei (TW)

(73) Assignee: ORIENT SERVICE CO., LTD., Taipei (TW)

( * ) Notice: Subject to any disclaimer, the term of this patent is extended or adjusted under 35 U.S.C. 154(b) by 0 days.

(21) Appl. No.: 15/891,287

(22) Filed: Feb. 7, 2018

(65) Prior Publication Data

US 2018/0161724 A1 Jun. 14, 2018

Related U.S. Application Data

(62) Division of application No. 15/052,025, filed on Feb. 24, 2016.

(30) Foreign Application Priority Data

Nov. 26, 2015 (TW) .............................. 104139500 A

(51) Int. Cl.
*B01D 53/68* (2006.01)
*B01D 53/76* (2006.01)

(52) U.S. Cl.
CPC ............. *B01D 53/68* (2013.01); *B01D 53/76* (2013.01); *B01D 2257/204* (2013.01); *B01D 2257/2027* (2013.01); *B01D 2258/0216* (2013.01); *Y02C 20/30* (2013.01)

(58) Field of Classification Search
None
See application file for complete search history.

(56) References Cited

U.S. PATENT DOCUMENTS

2005/0175524 A1* 8/2005 Mori ...................... B01D 53/68
423/240 R

* cited by examiner

*Primary Examiner* — Walter D. Griffin
*Assistant Examiner* — Jelitza M Perez
(74) *Attorney, Agent, or Firm* — Chun-Ming Shih

(57) ABSTRACT

A device of purifying a fluoride in a semiconductor process waste gas includes a reaction chamber formed in a waste gas treating tank, and a heat pipe disposed in the waste gas treating tank and inserted into the reaction chamber. A water injection pipe is disposed at the outside end of the heat pipe formed at an outside of the waste gas treating tank, a heating rod is disposed in and passes through the heat pipe, a passage is formed between the heating rod and the heat pipe, water is guided and enters into the passage by the water injection pipe, the water in the passage contacts with the heating rod to produce a mist gaseous water at a high temperature, the mist gaseous water is guided and enters into the reaction chamber via the plurality of spit-outs to dissolve the fluoride to be reacted into a hydrogen fluoride, and a dissolving temperature of the mist gaseous water contacting with the fluoride is 370~1300° C.

9 Claims, 6 Drawing Sheets

(A-A)

(B-B)

(C-C)

(D-D)

DEVICE OF PURIFYING HYDROGEN FLUORIDE IN SEMICONDUCTOR PROCESS WASTE GAS

BACKGROUND OF THE INVENTION

1. Field of the Invention

The present invention relates to a purifying technique of a semiconductor process waste gas, especially to a method and a device of purifying a fluoride in a semiconductor process waste gas.

2. Description of Related Art

In order to mitigate a serious effect of a greenhouse effect on the global warming, the World Semiconductor Industry Association decides to list some special gases, such as, SF6, CF4, C2F6, C3F8, CHF3, NF3, F2 named as perfluorinated compounds, as reduction subjects of harmful gases rendering the greenhouse effect.

Because the waste gases emitted from the semiconductor process including $NF_3$, $F_2$ named as perfluorinated compounds will cause environment pollution after the harmful fluoride gases are emitted to the air, there are provided devices of processing semiconductor process waste gases. In a pre-processing reaction chamber for capturing the fluoride, generally by using a high temperature flame or a hot pin to be directly be guided or inserted into the pre-processing reaction chamber, the harmful fluoride gas is dissolved into a non-harmful fluoride ion so as to purify the waste gas.

In the process of dissolving the fluoride gas into non-harmful fluoride ions by using the high temperature flame or the hot pin, a pre-washing process step is needed in the pre-processing reaction chamber of the waste gas treating tank to supply sufficient hydrogen ions so that the fluoride can react with the hydrogen ion in the water in a high temperature environment. However, the pre-washing process step is very time-consuming and proliferator produced in the water after the water molecular contacts with the fluoride will adhere to an inner wall of the reaction chamber of the waste gas treating tank. A water wall of dirt preventing or an additional cleaning step is needed and arranged for the inner wall of the reaction chamber, a purifying efficiency of dissolving the fluoride gas into non-harmful fluoride ions is decreased and a cost of the waste gas treating device and the purifying step increases. It is necessary to solve the above problems.

SUMMARY OF THE INVENTION

It is an objective of the present invention to solve a problem saying that the conventional purifying process of the fluoride by using the high temperature flame or the hot pin is too complex in process step and in structure in the process of capturing the fluoride in the pre-processing reaction chamber of the semiconductor waste gas treating tank. In more details, in the present invention a fluorine atom will be very active in a specific high temperature environment, the water molecular will exhibit properties of a mist gaseous water in order to capturing the fluoride by using the mist gaseous water molecules at a high temperature, the fluoride is dissolved into a fluoride hydrogen (HF) and the purifying efficiency of the gas is increased.

In order to solve the problems, it is another objective of the present invention to provide a method of purifying a fluoride in a semiconductor process waste gas comprising the steps of:

importing a mist gaseous water at a high temperature produced by heating water in a reaction chamber of a semiconductor waste gas treating tank; and dissolving the fluoride into a hydrogen fluoride by using the mist gaseous water, wherein a dissolving temperature of the mist gaseous water contacting, with the fluoride is 370~1300° C.

According to the present invention, the mist gaseous water is preferably imported into the reaction chamber by spraying.

According to the present invention, the capturing ring preferably has a plurality of tongue strips formed on a circumferential wall of the capturing ring extending at a direction of the axis line.

According to the above method, it is another objective of the present invention to provide a device of purifying a fluoride in a semiconductor process waste gas, comprising:

a reaction chamber formed in a waste gas treating tank of semiconductor having at least one guide pipe of the semiconductor process waste gas for guiding and entering the semiconductor process waste gas comprising the fluoride into the reaction chamber; and a heat pipe disposed in the waste gas treating tank and inserted into the reaction chamber, the heat pipe having an outside end formed at an outside of the waste gas treating tank and an inner end formed in the reaction chamber, a water injection pipe being disposed at the outside end, a plurality of spit-outs being disposed and formed at the inner end and passing through and arranged on a pipe wall of the heat pipe, wherein a heating rod is disposed in and passes through the heat pipe, a passage is formed between the heating rod and the heat pipe, the passage is fluidly connected to the water injection pipe and is fluidly connected to the reaction chamber via the plurality of spit-outs, water is guided and enters into the passage by the water injection pipe, the water in the passage contacts with the heating rod to produce a mist gaseous water at a high temperature, the mist gaseous water is guided and enters into the reaction chamber via the plurality of spit-outs to dissolve the fluoride to be reacted into a hydrogen fluoride, and a dissolving temperature of the mist gaseous water contacting with the fluoride is 370~1300° C.

According to the present invention, the mist gaseous water is preferably guided and enters into the reaction chamber via the plurality of spit-outs by spraying.

According to the present invention, the plurality of spit-outs preferably pass through and extend through, and the plurality of spit-outs are disposed around a surrounding pipe wall of the heat pipe located at the inner end.

According to the present invention, a top cover is preferably disposed at a top side of the semiconductor waste gas treating tank, and the guide pipe and the heat pipe of the semiconductor waste gas are spaced apart from each other and disposed at the top cover.

According to the present invention, the heat pipe, the passage and the heating rod are preferably arranged in a concentric circle way of a straight line.

According to the present invention, a ring heater used as a tank wall of the waste gas treating tank is preferably disposed at a periphery of the reaction chamber, and the dissolving temperature reaches when the ring heater is heating.

According to the present invention, a plurality of reaction tanks are preferably formed in the reaction chamber by using a plurality of separator plates to separate, at least one holes fluidly connected to the plurality of reaction tanks are respectively formed on the plurality of separator plates, the plurality of reaction tanks are fluidly connected each other via the holes to form an air duct channel, and the air duct channel is used for guiding the waste gas and the mist gaseous water to move through the reaction chamber.

According to the present invention, the holes respectively formed on the plurality of separator plates are preferably correspondent to each other located at a first to fourth quadrants in a X-/Y-coordinate plane in a staggered way so that the air duct channel is in a spiral form.

According to the present invention, partition walls are preferably disposed between the plurality of separator plates.

In accordance to the above method and the device, the technical effects of the present invention are as follows: In a process of capturing the fluoride in the pre-processing reaction chamber of the semiconductor waste gas treating tank, it is not necessary to use the conventional high temperature flame or the hot pin used together with a water supply step of fluoride of the pre-washing process, and the complex structure of the device is simplified. The purifying efficiency of the harmful fluoride by using capturing and dissolution of the high temperature mist gaseous water is increased. The purifying efficiency is higher than that of the conventional heating catalytic method by using the high temperature flame or the hot pin.

Other objectives, advantages, and novel features of the invention will become more apparent from the following detailed description when taken in conjunction with the accompanying drawings.

DETAILED DESCRIPTION OF THE PREFERRED EMBODIMENT

The scope and contents of the present invention are not limited to a scope of the following examples.

Figure 1:
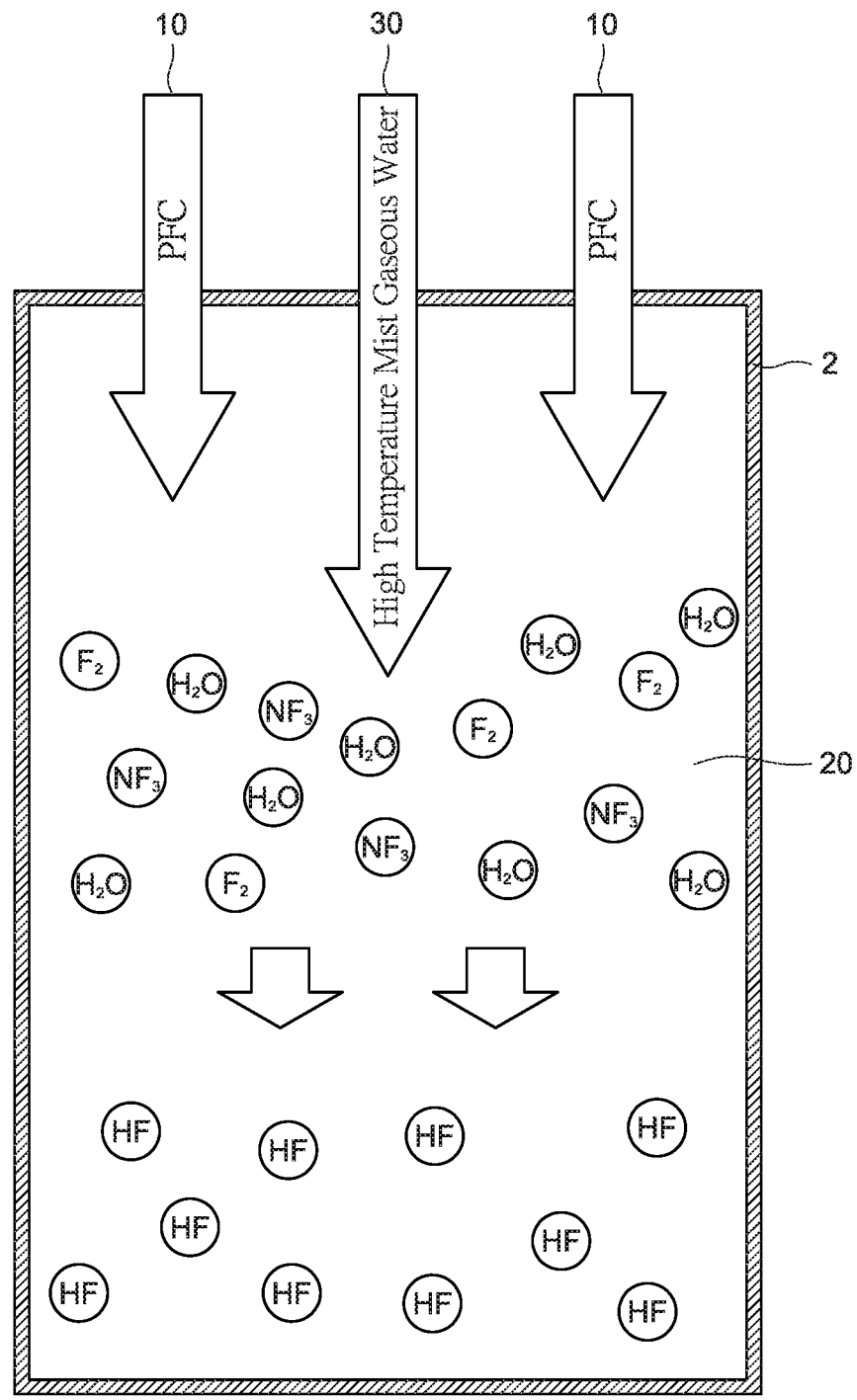
FIG. 1 is a explanative schematic diagram of a purifying method of the present invention.

Please refer to FIG. 1 which discloses a schematic diagram of a method of purifying a fluoride in a semiconductor process waste gas of a preferred embodiment of the present invention. In the semiconductor process device, there are provided with a waste gas treating tank 2 in which a pre-processing reaction chamber 20 is formed. The waste gas including perfluorinated compounds (PFC) produced in the semiconductor process is guided into the pre-processing reaction chamber 20 in order to do pre-processing dissolution of the harmful perfluorinated compounds (PFC).

In the present invention, a high temperature mist gaseous water 30 is guided into the pre-processing reaction chamber 20. The so-called "guided" means that the gaseous water is sprayed to obtain a better effect. The high temperature mist gaseous water 30 is produced by heating room temperature water into steam.

The water is heated at a temperature of 100° C. to produce steam. When the water continues to be heated to a temperature of 370° C. or above, mist gaseous water is generated. When water continues to be heated to a temperature of 950° C. or above, the hydrogen of the water molecular will be easily decomposed into gaseous hydrogen ion (H$^+$). Thus, the temperature of the water guided into the pre-processing reaction chamber 20 should be a high temperature from 370° C. to 1300° C. The requirement condition for exhibiting mist gaseous water is a temperature of 370° C.

Because fluorine (F) is very reactive at a high temperature of 850° C., when a temperature of the pre-processing reaction chamber 20 reaches to 370~1300° C., the perfluorinated compounds (PFC), such as NF3, F2, etc. will be fast dissolved into a fluoride ion (F$^-$) by the mist gaseous water 30 and the fluoride ion (F$^-$) will react with the gaseous hydrogen ion (H$^+$) generated by dissolving the mist gaseous water 30 to combine and to produce an aqueous hydrogen fluoride (HF).

A following reaction equation I discloses a reaction equation when the fluoride is F$_2$.

$$2F_2 + 2H_2O \xrightarrow{870-1800° C.} 4HF + O_2. \qquad \text{I}$$

A following reaction equation II discloses a reaction equation when the fluoride is NF$_3$.

$$4NF_2 + 6H_2O \xrightarrow{870-1800° C.} 12HF + 3O_2 + 2N_2. \qquad \text{II}$$

In one preferred embodiment, because fluorine (F) is very reactive at a high temperature of 850° C., when the mist gaseous water 30 in the pre-processing reaction chamber 20 is heated to a dissolving temperature of to 850~1300° C., a purifying effect of the fluoride ion (F$^-$) in the dissolving perfluorinated compounds (PFC) is greatly increased and the fluoride ion (F$^-$) will easily react with the gaseous hydrogen ion (H$^+$) generated by dissolving the mist gaseous water 30 to combine and to produce an aqueous hydrogen fluoride (HF). The aqueous hydrogen fluoride (HF) is scrubbed and captured by the washing step of the after-processing waste gas treating tank 2 to form a non-harmful gas to be emitted to the outside (the washing step of the after-processing waste gas treating tank 2 is not the main point or the improvement of this invention, it will not described in more details).

Figure 2:
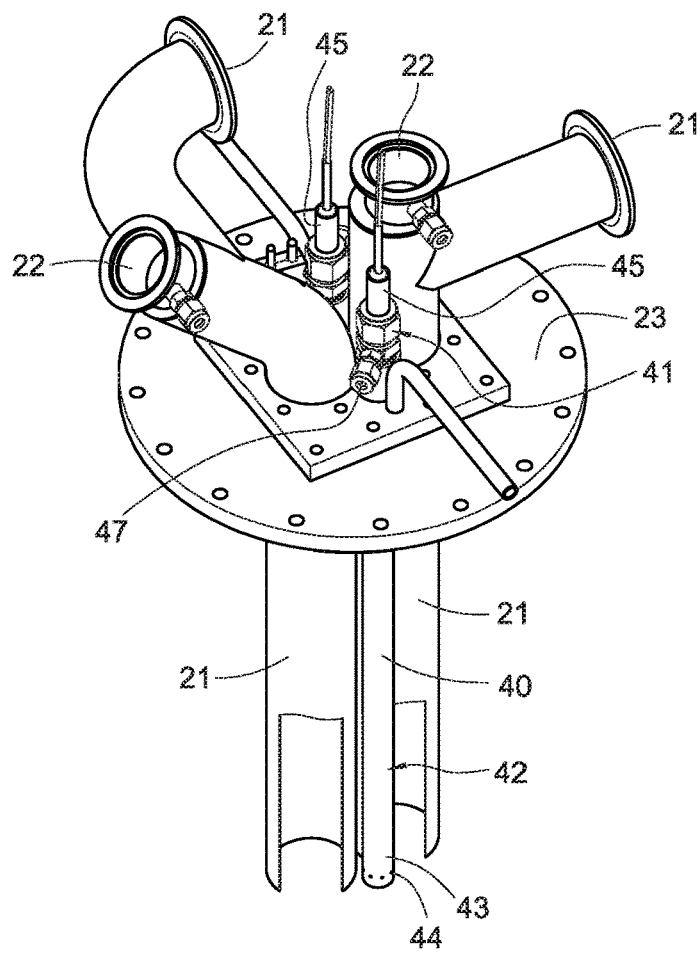
FIG. 2 is a three-dimensional explosive diagram showing a heat pipe of the present invention.
Figure 3:
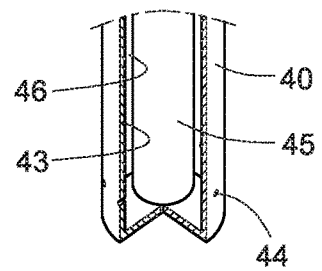
FIG. 3 is a three-dimensional explosive diagram showing the heat pipe of FIG. 2 according to the invention.
Figure 4:
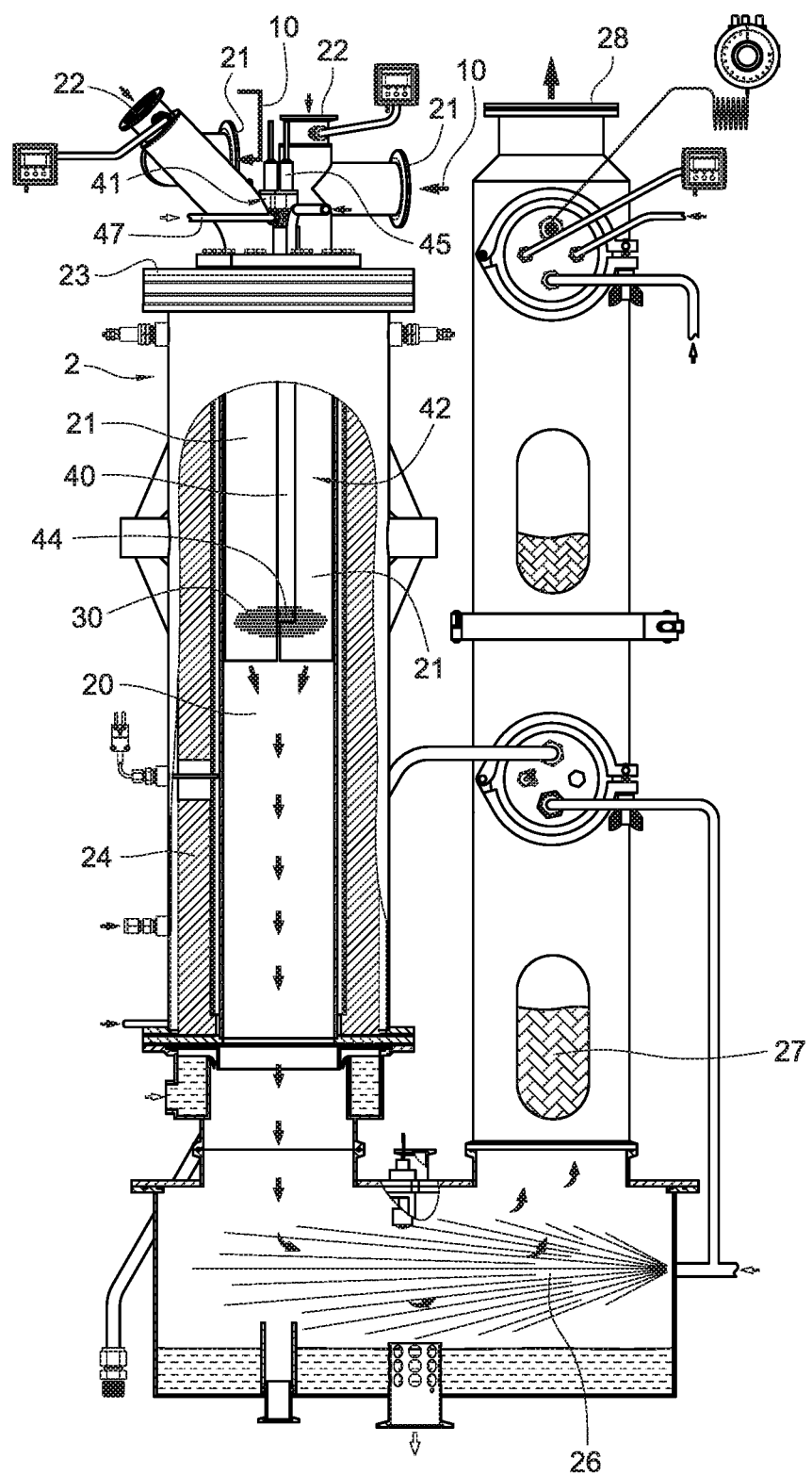
FIG. 4 is a cross-section view showing an arrangement of the heat pipe in the semiconductor waste gas treating tank of FIG. 2 of the present invention.

In order to concretely implement the method please refer to FIGS. 2 to 4 which demonstrate a second preferred embodiment of the purifying device implemented in the invention. The FIG. 2 discloses a structural diagram of a heat pipe 40. The FIG. 3 discloses a three-dimensional explosive diagram of the heat pipe 40. The FIG. 4 discloses an arrangement configuration of the heat pipe 40 disposed at the pre-processing reaction chamber 20 of the semiconductor waste gas treating tank 2.

Two guide pipes 21 of the semiconductor waste gas 10 are disposed at the waste gas treating tank 2. The guide pipes 21 are fluidly connected to the pre-processing reaction chamber 20. The guide pipes 21 are used for guiding the semiconductor process waste gas 10 containing the perfluorinated compounds (PFC) into the reaction chamber 20. A top cover 23 is disposed at the top of the waste gas treating tank 2. The guide pipes 21 are disposed at the top cover 23. A nitrogen pipe 22 is fluidly connected to the guide pipes 21. Nitrogen gas is guided by the nitrogen pipe 22 to enter into the reaction chamber 20 via the guide pipe 21.

A heat pipe 40 inserted into the reaction chamber 20 is disposed in the waste gas treating tank 2. In implementation, the heat pipe 40 is spaced away from the guide pipe 21 of the semiconductor process waste gas 10 and disposed at the top cover 23. At both ends of the heat pipe 40, an outside end 41 located at an outside of the waste gas treating tank 2 and an inner end located at an inside of the reaction chamber 20 are formed. A water injection pipe 47 is fluidly connected to the outside end 41. Room temperature water is guided by the water injection pipe 47 to enter into the heat pipe 40. A plurality of spit-outs 44 spaced apart and passed through and disposed on the pipe wall 43 of the heat pipe 40 are formed on a periphery pipe wall 43 located at the inner end of the reaction chamber 20 on the heat pipe 40. A heating rod 45 is inserted into and disposed at the heat pipe 40. The heating rod 45 can be an electrothermal heating rod. The heating rod 45 is used for heating water injected from the water injection pipe 47 into the heat pipe 40 so as to reach a water temperature of 370~1300° C. When the water is heated to reach a temperature of 370° C. or above to exhibit mist gaseous water which move out of the spit-outs 44 located on the pipe wall of the heat pipe 40 to form the mist gaseous water 30 to be guided into the reaction chamber 20.

In one embodiment, a passage 46 is formed between the heating rod 45 and the pipe wall 43 of the heat pipe 40. The passage 46 is fluidly connected to the water injection pipe 47 and is fluidly connected to the reaction chamber 20 via the plurality of spit-outs 44 so as produce the mist gaseous water 30 at a high temperature by heating of the heating rod 45. Thus, the mist gaseous water 30 enters the reaction chamber 20 via the spit-outs 44. Because a cross-area of the spit-out 44 is smaller than that of the passage 46, the mist gaseous water 30 enters the reaction chamber 20 by spraying. The heat pipe 40, the passage 46 and the heating rod 45 are arranged in a concentric circle way of a straight line so that the mist gaseous water 30 enters the reaction chamber 20 from the different spit-outs 44 under the same pressure in order to uniformly spraying in the reaction chamber 20.

A ring heater 24 is disposed at the periphery of the reaction chamber 20. The ring heater 24 is used as an inner tank wall of the waste gas treating tank 2 in one embodiment. The ring heater 24 is used for heating and maintaining the temperature in the reaction chamber 20 so as to the temperature of the waste gas 10 and the mist gaseous water 30 reach to a dissolving temperature and so as to increase a dissolving effect of the fluoride ion dissolved in the perfluorinated compounds (PFC) because the ring heater 24 is made by an electrothermal heating rod. Then, the fluoride ion ($F^-$) can be easily combined with the hydrogen ion ($H^+$) in the mist gaseous water 30 to produce an aqueous hydrogen fluoride (HF). The temperature of the guide pipe 21 inserted in the reaction chamber 20 is increased by the high temperature environment in the reaction chamber 20. When the waste gas 10 moves through the guide pipe 21 and enters into the reaction chamber 20, the temperature of the waste gas 10 is increase by contacting with the guide pipe 21 so that the temperature of the waste gas 10 can fast reach to the needed dissolving temperature to increase an purifying effect of the waste gas 10 during purifying duration.

Please refer to FIG. 4 which demonstrates that the waste gas 10 enters into the pre-processing reaction chamber 20 of the waste gas treating tank 2 via the guide pipe 21. When the mist gaseous water 30 enters into the pre-processing reaction chamber 20 of the waste gas treating tank 2 via the spit-outs 44 located on the heat pipe 40, the waste gas 10 and the mist gaseous water 30 which are heated up to the dissolving temperature by the heating rod 45 and the ring heater 24 chemically react with each other in the reaction chamber 20. For example, the perfluorinated compounds (PFC), such as, $NF_3$, $F_2$, etc. are fast dissolved into the fluoride ion ($F^-$) by the mist gaseous water 30, and the fluoride ion ($F^-$) combines with the gaseous hydrogen ion ($H^+$) dissolved in the mist gaseous water 30 to produce the aqueous hydrogen fluoride (HF). The waste gas 10 containing the hydrogen fluoride (HF) is sequentially moved from the pre-processing reaction chamber 20 in the waste gas treating tank 2 and pass through the first air washer 25 and the second air washer 26 located at the post-processing part in the waste gas treating tank 2. The aqueous hydrogen fluoride (HF) is dissolved in the water during a scrubbing step via the first air washer 25 and the second air washer 26 so as to convert the waste gas 10 into non-harmful gas. The non-harmful gas is emitted to the outside atmosphere via the gas discharge port 27.

Figure 5:
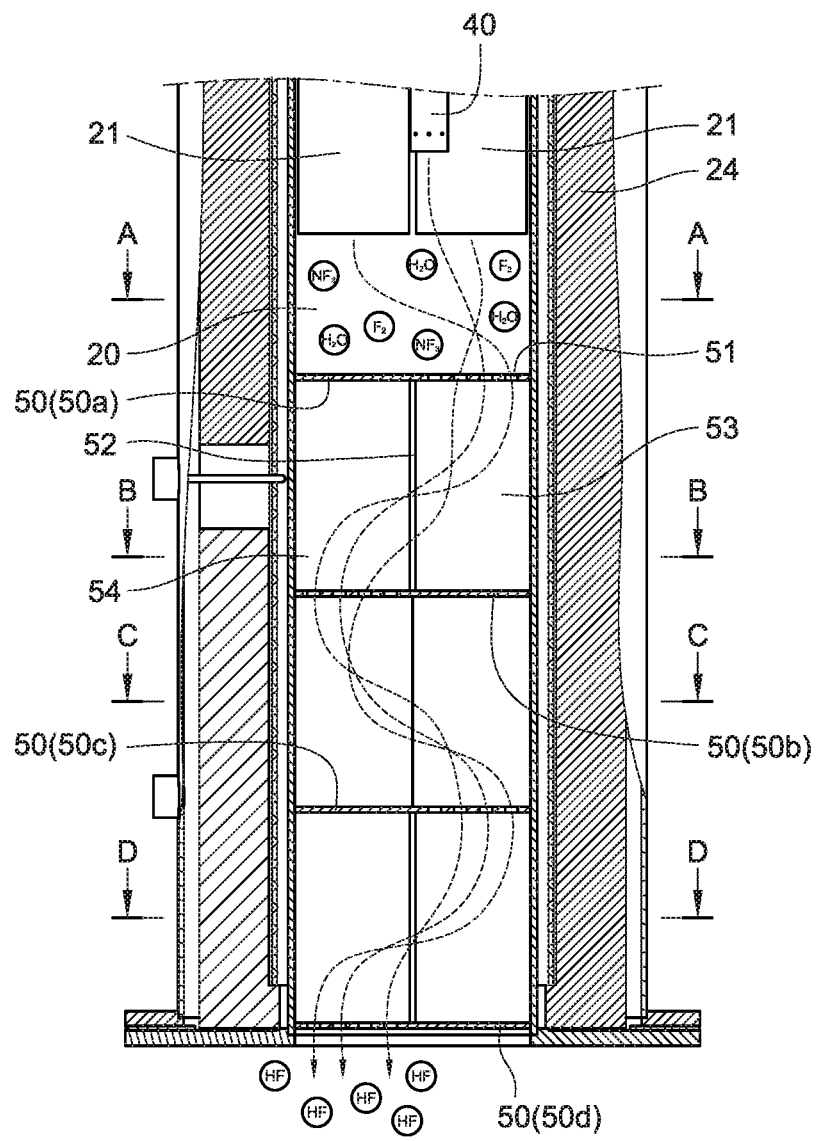
FIG. 5 is a cross-section view showing a separator plate in the purifying device of the present invention.
Figure 5A:
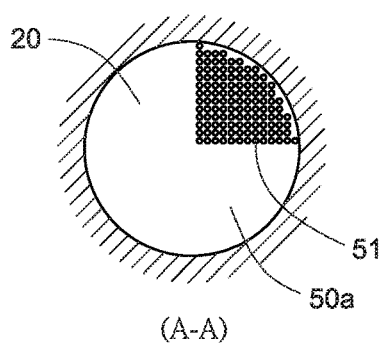
FIG. 5a is a cross-section view taken along A-A line of FIG. 5 of the present invention.
Figure 5B:
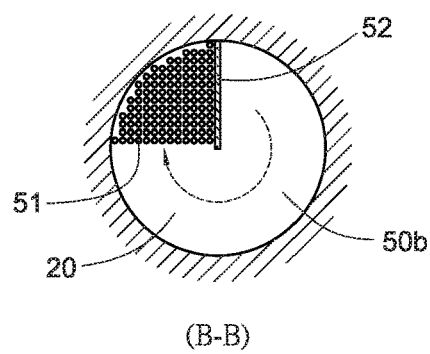
FIG. 5b is a cross-section view taken along B-B line of FIG. 5 of the present invention.
Figure 5C:
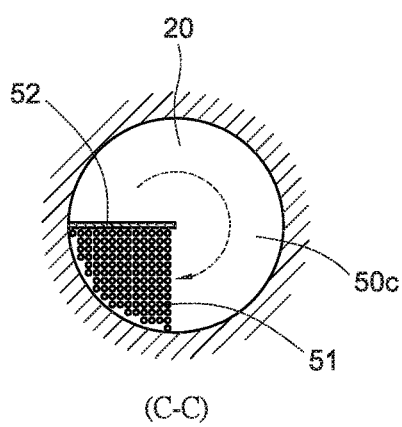
FIG. 5c is a cross-section view taken along C-C line of FIG. 5 of the present invention.
Figure 5D:
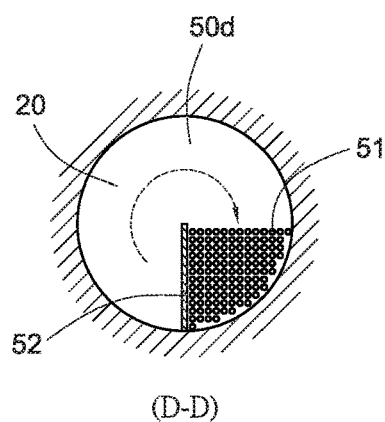
FIG. 5d is a cross-section view taken along D-D line of FIG. 5 of the present invention.
Figure 6:
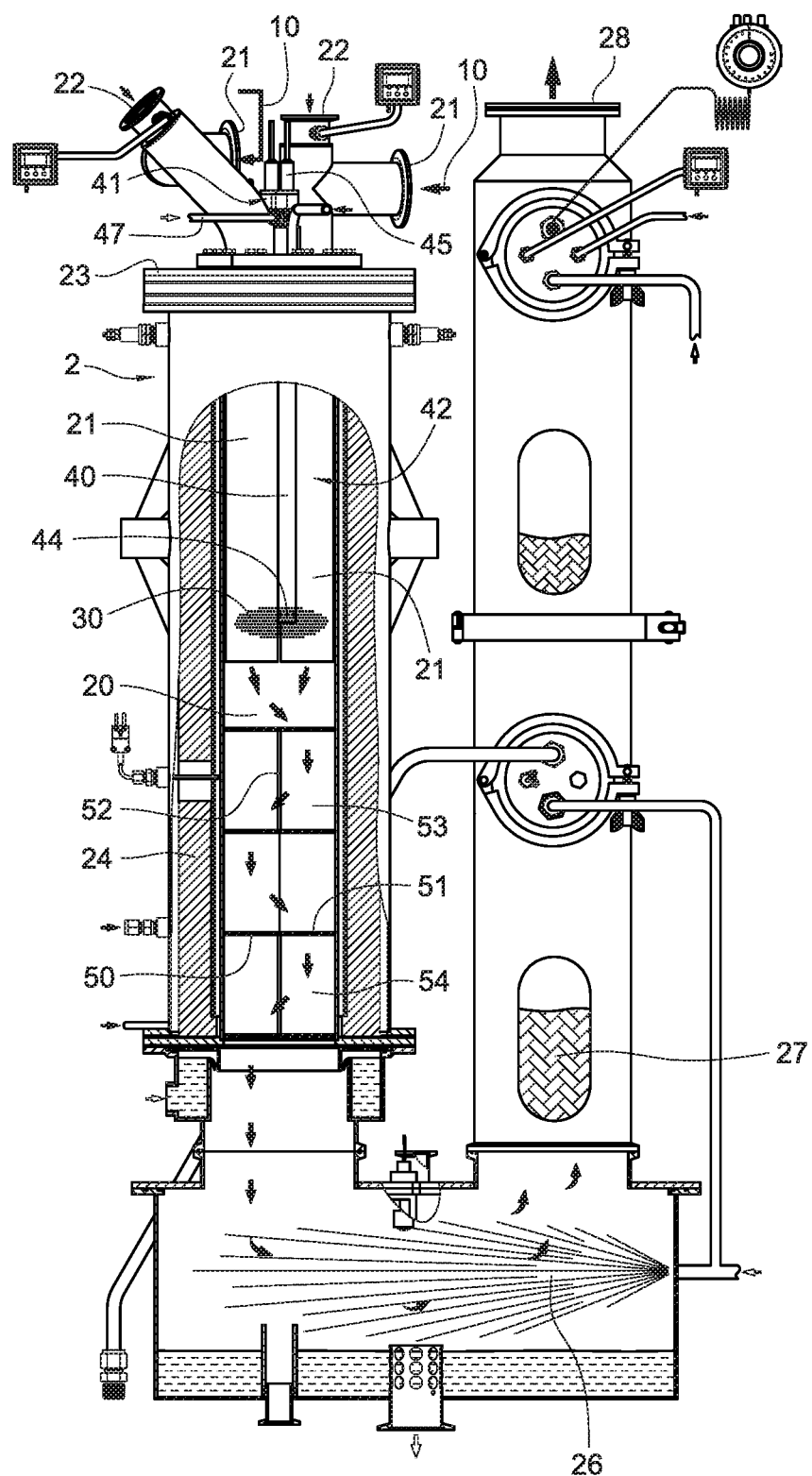
FIG. 6 is a cross-section view showing a separator plate arranged in the semiconductor waste gas treating tank of FIG. 5 of the present invention.

Please refer to FIGS. 5 and 6 which demonstrate implementation details of a third embodiment of a purifying device of the present invention. FIG. 5 discloses a cross-section view of the separator plate. FIGS. 5a to 5d disclose cross-section views of the separator plate of FIG. 5 at different locations. FIG. 6 discloses a configuration view of the separator plate disposed at the pre-processing reaction chamber of waste gas treating tank.

Please refer to FIGS. 5 and 6. In one embodiment a plurality of separator plates 50 are disposed in the reaction chamber 20. The plurality of separator plates 50 are arranged and spaced apart in the reaction chamber 20 by locking means or soldering. A reaction tank 53 is formed between the plurality of separator plates 50. The reaction tanks 53 are fluidly connected to each other via the holes 51 formed on the separator plates 50 so as to form an air duct channel 54. The waste gas 10 and the mist gaseous water 30 are guided to move through the reaction chamber 20 by the air duct channel 54.

The plurality of separator plates 50 disclosed in FIG. 5 comprise a first separator plate 50a, a second separator plate 50b, a third separator plate 50c and a fourth separator plate 50d. Form FIGS. 5a to 5d it can be known that the holes 51 formed on the first separator plate 50a, the second separator plate 50b, the third separator plate 50c and the fourth separator plate 50d are correspondent to each other and located at a first to fourth quadrants in a X-/Y-coordinate plane in a staggered way. The holes 51 formed on the separator plates 50a to 50d can be in a single hole way or in a web-like hole layer. partition wall 52 for partially separating the reaction tanks 53 is disposed between the separator plates 50. Furthermore, the partition wall 52 is used for guiding and connecting the reaction tanks 53 via the holes 51 disposed on the neighboring separator plates 50 so as to construct and to form the tortuous air duct channel 54. Thus, the waste gas 10 and the mist gaseous water 30 are guided to move through the reaction tanks 53 and to increase a staying duration of the waste gas 10 and the gaseous water 30 in the reaction tanks 53 in order to increase the converting efficiency of perfluorinated compounds (PFC) dissolved in the waste gas 10 converted into the hydrogen fluoride MO by the gaseous water 30.

Although the present invention has been explained in relation to its preferred embodiment, it is to be understood that any other possible modifications and variations can be made without departing from the scope of the invention as hereinafter claimed.

I claim:

1. A device of purifying a fluoride in a semiconductor process waste gas, comprising:
    a reaction chamber formed in a waste gas treating tank of semiconductor having at least one guide pipe of the semiconductor process waste gas for guiding and entering the semiconductor process waste gas comprising the fluoride into the reaction chamber; and
    a heat pipe disposed in the waste gas treating tank and inserted into the reaction chamber, the heat pipe having an outside end formed at an outside of the waste gas treating tank and an inner end formed in the reaction chamber, a water injection pipe being disposed at the outside end, a plurality of spit-outs being disposed and formed at the inner end and passing through and arranged on a pipe wall of the heat pipe,
    wherein a heating rod is disposed in and passes through the heat pipe, a passage is formed between the heating rod and the heat pipe, the passage is fluidly connected to the water injection pipe and is fluidly connected to the reaction chamber via the plurality of spit-outs, water is guided and enters into the passage by the water injection pipe, the water in the passage contacts with the heating rod to produce a mist gaseous water at a high temperature, the mist gaseous water is guided and enters into the reaction chamber via the plurality of spit-outs to dissolve the fluoride to be reacted into a hydrogen fluoride, and a dissolving, temperature of the mist gaseous water contacting with the fluoride is 370~1300° C.

2. The device of purifying the fluoride in the semiconductor process waste gas as claimed in claim 1, wherein the mist gaseous water is guided and enters into the reaction chamber via the plurality of spit-outs by spraying.

3. The device of purifying the fluoride in the semiconductor process waste gas as claimed in claim 2, wherein the plurality of spit-outs pass through and extend through, and the plurality of spit-outs are disposed around a surrounding pipe wall of the heat pipe located at the inner end.

4. The device of purifying the fluoride in the semiconductor process waste gas as claimed in claim 1, wherein a top cover is disposed at a top side of the semiconductor waste gas treating tank, and the guide pipe and the heat pipe of the semiconductor waste gas are spaced apart from each other and disposed at the top cover.

5. The device of purifying the fluoride in the semiconductor process waste gas as claimed in claim 1, wherein the heat pipe, the passage and the heating rod are arranged in a concentric circle way of a straight line.

6. The device of purifying the fluoride in the semiconductor process waste gas as claimed in claim 1, wherein a ring heater used as a tank wall of the waste gas treating tank is disposed at a periphery of the reaction chamber, and the dissolving temperature reaches when the ring heater is heating.

7. The device of purifying the fluoride in the semiconductor process waste gas as claimed in claim 1, wherein a plurality of reaction tanks are formed in the reaction chamber by using a plurality of separator plates to separate, at least one holes fluidly connected to the plurality of reaction tanks are respectively formed on the plurality of separator plates, the plurality of reaction tanks are fluidly connected each other via the holes to form an air duct channel, and the air duct channel is used for guiding the waste gas and the mist gaseous water to move through the reaction chamber.

8. The device of purifying the fluoride in the semiconductor process waste gas as claimed in claim 7, wherein the holes respectively formed on the plurality of separator plates are correspondent to each other located at a first to fourth quadrants in a X-/Y-coordinate plane in a staggered way so that the air duct channel is in a spiral form.

9. The device of purifying the fluoride in the semiconductor process waste gas as claimed in claim 7, wherein partition walls are disposed between the plurality of separator plates.

* * * * *